United States Patent
Tsirkin

(10) Patent No.: US 12,141,597 B2
(45) Date of Patent: Nov. 12, 2024

(54) EFFICIENT OUT OF ORDER REQUEST COMPLETION

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 461 days.

(21) Appl. No.: 17/107,243

(22) Filed: Nov. 30, 2020

(65) Prior Publication Data
US 2022/0171645 A1    Jun. 2, 2022

(51) Int. Cl.
G06F 9/455 (2018.01)
G06F 13/16 (2006.01)
G06Q 10/0631 (2023.01)

(52) U.S. Cl.
CPC ...... *G06F 9/45558* (2013.01); *G06F 13/1668* (2013.01); *G06F 2009/45579* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 6,532,525 B1 * | 3/2003 | Aleksic | G06F 13/1689 711/168 |
| 8,255,475 B2 | 8/2012 | Kagan et al. | |
| 8,307,191 B1 | 11/2012 | Jain | |
| 8,402,172 B2 | 3/2013 | Muppirala et al. | |
| 8,745,276 B2 | 6/2014 | Bloch et al. | |
| 8,875,162 B2 | 10/2014 | Agesen et al. | |
| 9,003,171 B2 | 4/2015 | Gonion | |
| 9,058,183 B2 | 6/2015 | Woller et al. | |
| 9,201,793 B2 | 12/2015 | Schneider | |
| 9,280,380 B2 | 3/2016 | Tsirkin | |
| 9,535,855 B2 | 1/2017 | Epstein | |
| 10,031,856 B2 | 7/2018 | Duluk, Jr. et al. | |
| 11,074,206 B1 * | 7/2021 | Jalal | G06F 13/4013 |

(Continued)

OTHER PUBLICATIONS

"Virtual I/O Device (VIRTIO) Version 1.1", OASIS, Dec. 20, 2018, 132 pages https://docs.oasis-open.org/virtio/virtio/v1.1/csprd01/virtio-v1.1-csprd01.html.

(Continued)

*Primary Examiner* — Wynuel S Aquino
(74) *Attorney, Agent, or Firm* — Dority & Manning, P.A.

(57) ABSTRACT

Systems and methods for supporting efficient out of order request completion. In one implementation, a processing device may receive, at a device of a host computing system, a plurality of requests from a driver for the device, wherein each request of the plurality of requests causes the device to perform a corresponding operation, and wherein the plurality of requests are received in a receive order; complete a first request of the plurality of requests by performing a first operation specified by the first request; determine whether the first request has completed in the receive order in relation to one or more previously completed requests; and responsive to determining that the first request has completed in the receive order in relation to the one or more previously completed requests, generating a first response to the first request that indicates that the first request has completed in the receive order in relation to the one or more previously completed requests.

16 Claims, 5 Drawing Sheets

(56) References Cited

U.S. PATENT DOCUMENTS

| | | | |
|---|---|---|---|
| 2011/0161620 A1 | 6/2011 | Kaminski et al. | |
| 2014/0089450 A1 | 3/2014 | Raindel et al. | |
| 2015/0212956 A1 | 7/2015 | Tsirkin et al. | |
| 2015/0309839 A1* | 10/2015 | Lu | G06F 9/5077 718/1 |
| 2016/0077946 A1 | 3/2016 | Raikin et al. | |
| 2017/0052916 A1* | 2/2017 | Kollu | G06F 13/4022 |
| 2017/0329655 A1 | 11/2017 | Yuan et al. | |
| 2019/0034208 A1 | 1/2019 | Comparan et al. | |
| 2019/0034223 A1* | 1/2019 | Yang | G06F 9/4881 |
| 2020/0004703 A1 | 1/2020 | Sankaran et al. | |
| 2020/0050557 A1* | 2/2020 | Wu | G06F 3/0658 |
| 2020/0125518 A1* | 4/2020 | Ringe | G06F 12/0817 |
| 2020/0142699 A1 | 5/2020 | Brown et al. | |
| 2020/0310993 A1 | 10/2020 | Kumar et al. | |
| 2021/0342272 A1 | 11/2021 | Tsirkin | |
| 2022/0138071 A1* | 5/2022 | Edara | G06F 12/0253 714/42 |

OTHER PUBLICATIONS

Sembrant, "Hiding and Reducing Memory Latency—Energy-Efficient Pipeline and Memory System Techniques", Uppsala University, 2016, 86 pages https://uu.diva-portal.org/smash/get/diva2:1040387/FULLTEXT01.pdf.

Herrmann, "Virtualization Tuning and Optimization Guide", Red Hat Customer Content Services, 2020, 50 pages https://access.redhat.com/documentation/en-us/red_hat_enterprise_linux/6/html-single/virtualization_tuning_and_optimization_guide/index.

Eranian S., et al., "Virtual Memory in the IA-64 Linux Kernel," InformIT, Nov. 8, 2002, 35 Pages, Retrieved from URL: https://www.informit.com/articles/article.aspx?)=299618seqNum=5.

Lesokhin I., et al., "Page Fault Support for Network Controllers," Technion—Israel Institute of Technology; Mellanox Technologies; VMware Research, Architectural Support for Programming Languages and Operating Systems, Apr. 8-12, 2017, 18 Pages, Retrieved from URL: https://courses.engr.illinois.edu/ece598ms/p2018/papers/paper254.pdf.

Lesokhin I., "I/O Page Faults," Technion—Israel Institute of Technology, Computer Science Department, Nov. 2015, 85 Pages, Retrieved from URL: https://www.cs.technion.ac.il/users/wwwb/cgi-bin/tr-get.cgi/2015/MSC/MSC-2015-21.pdf.

Microsoft Docs: "Network Data Buffer Management," Windows Drivers, Feb. 20, 2018, 4 Pages, [Retrieved on Feb. 6, 2020] Retrieved from URL: https://docs.microsoft.com/en-us/windows-hardware/drivers/netcx/network-data-buffer-management.

Nordholz J.C., "Efficient Virtualization on Hardware with Limited Virtualization Support," Technical University Berlin Institute for Software Technology and Theoretical Computer Science, May 2, 2011, 70 Pages, Retrieved from URL: https://www.isti.tu-berlin.de/fileadmin/fg214/finished_theses/Nordholz/diplom_nordholz.pdf.

Siemon D., "Queueing in the Linux Network Stack," Linux Journal LLC, Sep. 23, 2013, 11 Pages, Retrieved from URL: https://www.linuxjournal.com/content/queueing-linux-network-stack.

Tsirkin M., "VirtIO Without the Virt—Towards Implementations in Hardware by Michael Tsirkin," YouTube, Uploaded by KVM Forum, Nov. 5, 2019, Filmed on Oct. 30, 2019, 28 Pages, Retrieved from URL: https://www.youtube.com/watch?v=bCOo-WAAZP4.

* cited by examiner

EFFICIENT OUT OF ORDER REQUEST COMPLETION

TECHNICAL FIELD

The present disclosure is generally related to computer systems, and more particularly, to efficient out of order request completion in computer systems.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. The hypervisor may abstract the physical layer and present this abstraction to virtual machines to use, by providing interfaces between the underlying hardware and virtual devices of virtual machines. To communicate over a network, a virtual machine may include a device driver to receive and transmit data to and from one or more physical or virtual devices.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
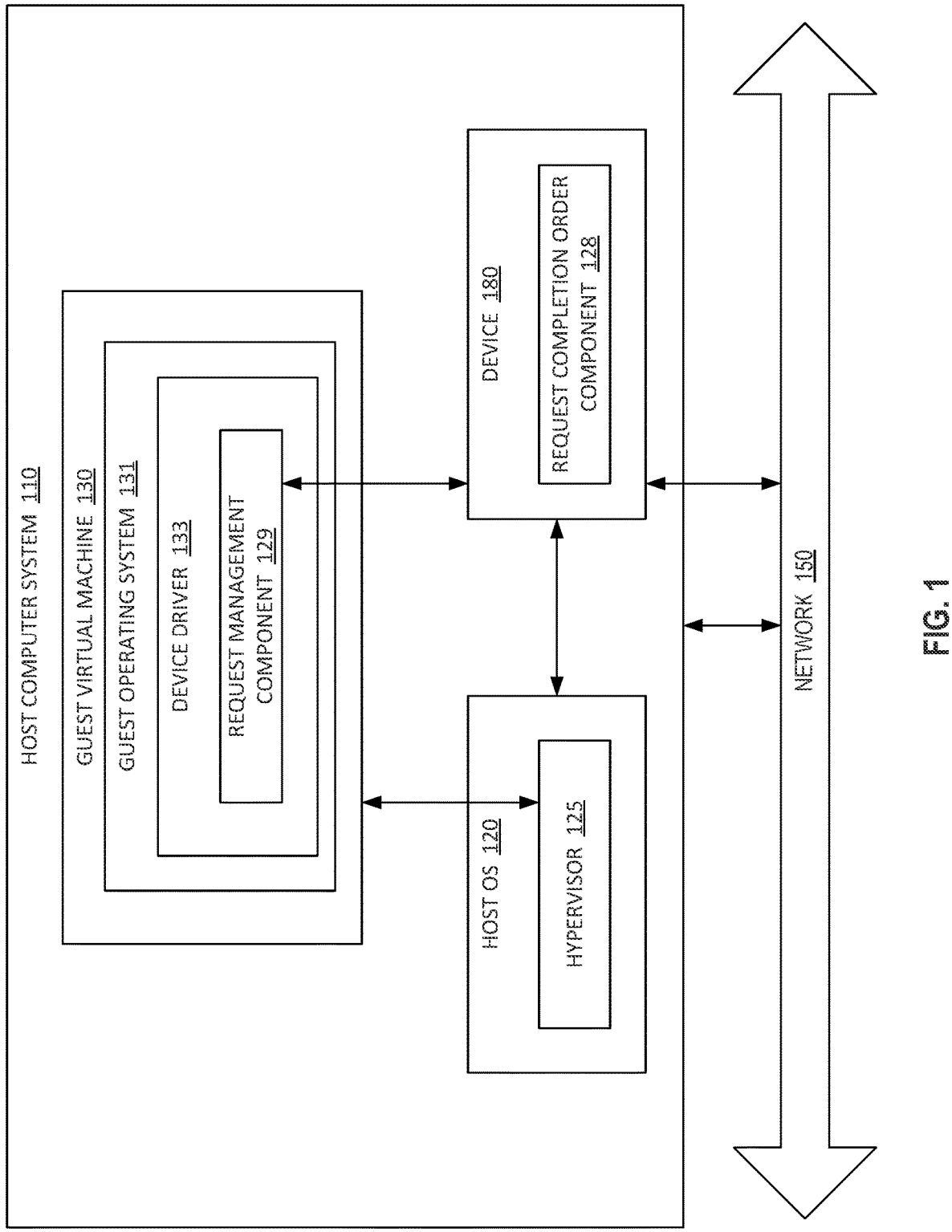
FIG. 1 depicts a high-level diagram of an example system architecture operating in accordance with one or more aspects of the present disclosure.

Described herein are methods and systems for facilitating efficient out of order request completion.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. Further, virtual machines can include network device drivers to communicate with virtual devices and/or physical devices of the host system, such as network interface devices.

In conventional systems, a virtual device (which can be a hardware or software device) can receive requests from the device driver of a virtual machine in a particular order. The virtual device can process them and provide responses to the device driver to indicate that the requests have been completed (e.g., request completions). Typically, requests are either processed in an "in order" fashion or an "out of order" fashion. In "in order" processing, requests are processed and reported in the same order in which the device driver submitted them to the device. In such "in order" processing, the device can report the number of requests completed to the device driver, since it knows that the requests are processed in the order sent. Alternatively, in "out of order" processing, requests are processed in any order. In such instances, a device reports each request as it is completed.

Out of order processing can provide improvements in request processing latency since high priority requests can be completed quickly while slower requests can remain outstanding. The out of order processing, however, typically results in significantly reduced throughput since it involves increases in memory bandwidth used for storing/providing multiple request completions. Conversely, in order processing can improve throughput since resources dedicated to request processing can be reduced but typically results in significantly increased request processing latency since slower requests can impede the completion of quicker and/or higher priority tasks. Conventional systems typically implement one method or the other on a device level. Thus, all requests for a device are either processed in order or out of order.

Aspects of the present disclosure address the above noted and other deficiencies by implementing technology to facilitate efficient out of order request completion. Both in order and out of order processing provide benefits and deficiencies when compared to the other. Aspects of the present disclosure facilitate the ability of a device to retain in order optimization for some requests, while also supporting out of order processing when necessary to achieve optimal results.

In one implementation, a driver of a device may be running as part of a guest operation system of a virtual machine. A device driver refers to a software component that enables the device to communicate with the operating system, with the network, and with other network devices. The driver may allocate a data structure for storing requests to be processed by the device. The device can receive requests from the driver and maintain a list of received requests in the order received. The device can complete a request, and determine whether that request has completed in order (e.g., in the receive order) in relation to previously completed requests. If so, the device can generate a response to the request that indicates the request has been processed in order. Otherwise, the device can generate a response to the request that indicates that the request has been processed out of order. In some implementations, the device can defer providing the completion notification (e.g., the generated response) to the device driver for a period of time to improve the efficiency of any in order completion notifications. When the driver receives a response indicating that the request was processed out of order, the driver can update its data structure to mark only that request as having been completed. If, on the other hand, the driver receives a response indicating that the request was processed in order, the driver can update its data structure to mark complete any pending request that was sent to the device before the request specified in the response.

Aspects of the present disclosure present advantages over conventional solutions to the issues noted above. By facilitating efficient out of order processing, devices can provide the bandwidth and throughput benefits of in order processing while at the same time provide the latency benefits of out of order processing. Since the device is not locked into a particular request processing paradigm for all requests, when encountering periods of request processing where requests are competed in an in order fashion, resources used for processing completion responses can be significantly reduced. At the same time, when the device encounters high priority requests that need to be completed quickly, or requests that may take longer to complete, these requests can be completed and notifications provided to the driver without impacting other requests processing. The device can handle the periods of out of order processing for as long as it is present, thus significantly improving latency where necessary, then falling back to in order processing when the workload stabilizes. Moreover, by improving the efficiency of the device, the efficiency of the overall computing system can be significantly improved, since the amount of system resources dedicated to the device driver and network communications for processing requests can also be reduced.

FIG. 1 depicts an illustrative architecture of elements of a host computer system 110, in accordance with an embodiment of the present disclosure. It should be noted that other architectures for host computer system 110 are possible, and that the implementation of a computer system utilizing embodiments of the disclosure are not necessarily limited to the specific architecture depicted by FIG. 1. Host computer system 110 may comprise one or more processors communicatively coupled to memory devices and input/output (I/O) devices. Host computer system 110 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest virtual machine (VM) 130 and manages its execution, e.g., by abstracting the physical layer, including processors, memory, and I/O devices, and presenting this abstraction to the VM as virtual devices. Guest VM 130 may be a software implementation of a machine that executes programs as though it were an actual physical machine. Although, for simplicity a single VM is depicted in FIG. 1, in some other embodiments host computer system 110 may comprise a plurality of VMs.

Guest VM 130 may have a corresponding guest operating system 131 that manages virtual machine resources and provides functions such as inter-process communication, scheduling, memory management, and so forth. Guest operating system 131 may run device driver 133. Network accelerator device driver 133 may be a software component that enables device 180 to communicate with guest operating system 131, as well as with other network accelerator devices and/or other network interface devices. Device driver 133 may include request management component 129 that may facilitate request handling for physical and/or virtual devices within host computer system 110. Request management component 129 may allocate a data structure for storing requests sent to device 180. In some implementations, the data structure may be a receive ring, a linked list, a table, a database, or other similar structure.

As shown in FIG. 1, host computer system 110 is connected to a network 150. Host computer system 110 may be a server, a mainframe, a workstation, a personal computer (PC), a mobile phone, a palm-sized computing device, etc. Network 150 may be a private network (e.g., a local area network (LAN), a wide area network (WAN), intranet, etc.) or a public network (e.g., the Internet). Host computer system 110 may also include device 180. Device 180 may be a physical device (e.g., a bare metal device), or a virtual device managed by hypervisor 125. In some implementations, device 180 may be a network interface device, a graphical interface card, or other similar device. Device 180 may communicate directly with network 150. Although, for simplicity, a device is depicted in FIG. 1, in some other embodiments host computer system 110 may comprise a plurality of devices and/or virtual devices. As shown, device 180 may include request completion order component 128 that may facilitate efficient out of order processing in devices and/or virtual devices.

In various implementations, device driver 133 can include a request management component 129 to manage requests sent to device 180 to be processed. Request management component 133 may be configured to store the requests sent to device 180 in a data structure (e.g., linked list, ordered queue, in memory table, etc.) within a memory space associated with device driver 133. The data structure can include a unique identifier associated with each requests sent to device 133 and can be configured to preserve the order in which the requests are sent to the device 180. In some implementations, request management component can receive notifications from request completion order component 128 of device 180 that indicate one or more of the requests have been completed by the device 180. In other implementations, request management component 129 can be configured with access to portions of memory associated with the device 180 so that it may observe the activity of device 180 directly.

In various implementations, request completion order component 128 can receive requests from the device driver 133, where each request causes the device 180 to perform a particular operation. For example, if device 180 is a networking interface card (NIC) or virtual NIC, the request may cause the device 180 to perform a network operation to send a packet through network 150. Once received, request completion order component 128 can store the requests in the order received (e.g., the receive order) in a data structure (e.g., linked list, ordered queue, in memory table, etc.) within a memory space for device 180.

Request completion order component 128 can then complete requests in accordance with available device resources as well as priority of the received requests. When a request is completed, request completion order component 128 can determine whether the completed request has completed in order (e.g., in the receive order) in relation to previously completed requests. If so, request completion order component 128 can generate a response to the request that indicates that the request has completed in order in relation to the previously completed requests. For example, request completion order component 128 can generate a notification that includes the unique identifier for the request, any data that might be returned to process the request, and an indicator (e.g., a flag, attribute value, etc.) that specifies that the request completed in order. If the completed request has not completed in order in relation to previously completed requests (e.g., completed out of order), request completion order component 128 can generate the response without the indicator. The response can subsequently be provided to request management component 129 of device driver 133.

In some implementations, request completion order component 128 can defer providing a response for a completed request for a period of time to allow for additional requests to be completed by device 180. In such instances, request completion order component 128 can store the generated response in the memory associated with device 180 until the waiting period has ended. If additional requests are completed during the waiting period, and those additional completions are in order in relation to a stored response, the stored response can be discarded and replaced with a response that refers to the most recently completed request. Thus, the response to be provided to the request management component 129 of device driver 133 can indicate that all requests up to and including the request associated with the response have all completed in order.

Request management component 129 can receive a completion response from request completion order component 128 and update its data structure of pending requests. If the response indicates that a request was processed out of order, request management component 129 can mark only that request as having been completed in its data structure. In some implementations, request management component 129 can update the entry for that request with an indicator that specifies that the request has completed. In other implementations, to reduce resources used by the device driver, request management component 129 can delete the entry for the completed request from the data structure. If the response indicates that a request was processed in order, request management component 129 can mark as complete (or delete from the data structure) the request specified in the response as well as any additional request that sent before the request specified in the completion response. In other words, request management component 129 can interpret an in order completion notification as indicating that the request as well as any request sent before it have all been completed by the device 180.

Request completion order component 128 is described in further detail below with respect to FIGS. 2-3.

Figure 2:
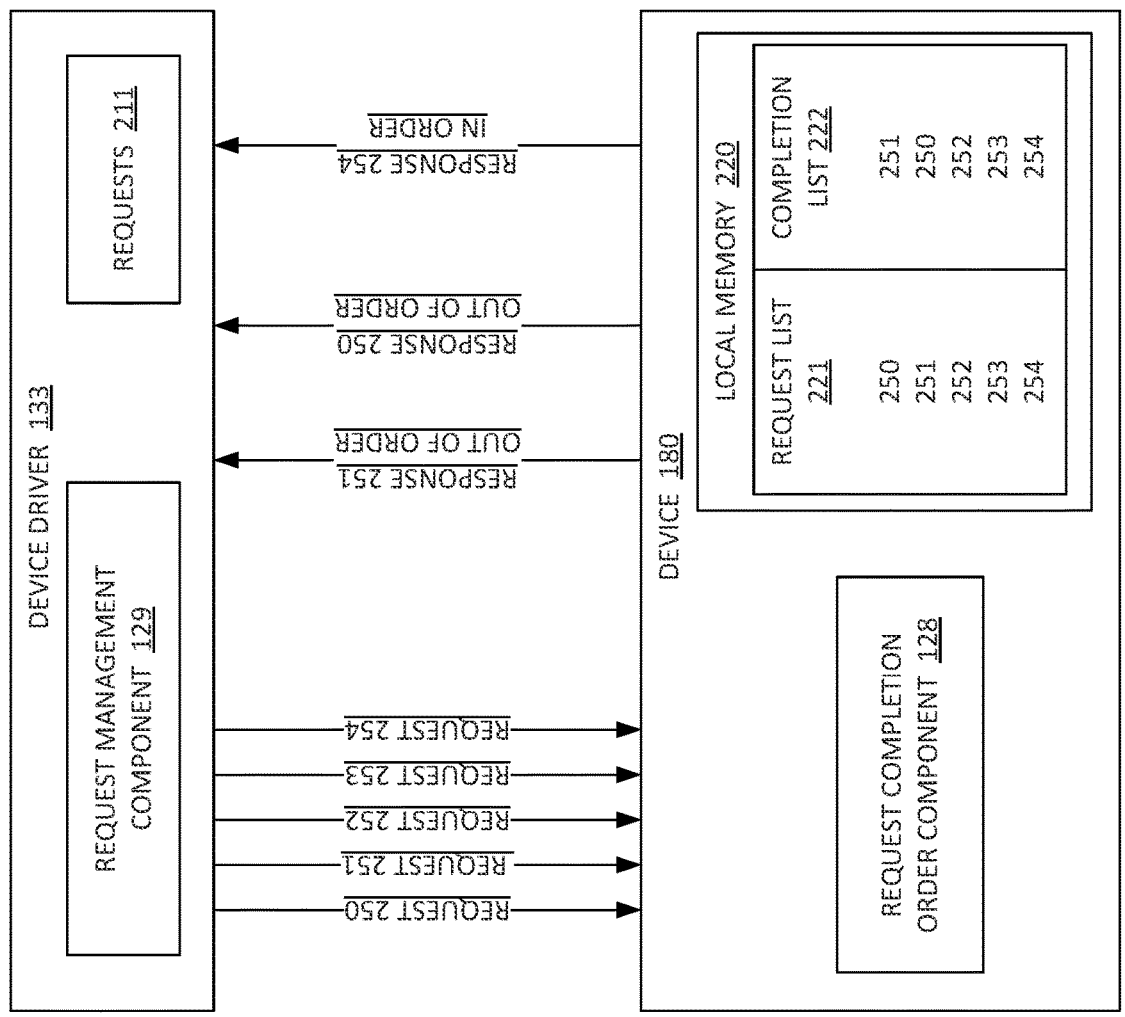
FIG. 2 depicts an illustration of efficient out of order request completion, in accordance with one or more aspects of the present disclosure.

FIG. 2 depicts an illustration of efficient out of order request completion, in accordance with one or more aspects of the present disclosure. As shown in FIG. 2, request management component 129 of device driver 133 can send multiple requests 250-254 to device 180 for processing. Note that while for simplicity of illustration only 5 requests are shown, in various implementations, more or fewer requests may be send to device 180. As shown, request 250, 251, 252, 253, and 254 are sent to device 180 in that order. In some implementations, request management component 129 can store information in requests 221 that includes the unique identifiers for each request sent to device 180 as well as the order in which they were sent. For example, requests 211 can be a linked list of requests where one entry points to the next entry in the sequence. Alternatively, each request may be assigned a unique identifier that indicates a sequential order, and stored in a list or table that is sorted by that unique identifier.

Request completion order component 128 can receive the requests in the order described above (e.g., the receive order) and can store each request in request list 221. As with requests 211, request list 221 can be configured as a linked list, an ordered queue or table, or the like. Request list 221 can be configured to preserve the order in which the requests were received from request management component 129.

As each request is completed, request completion order component 128 can determine whether the completed request has been completed in order in relation to other completed requests. As shown, the first request completed is request 251, which is the second request received. Request completion order component 128 can use the identifier in the completed request to determine whether any requests were received prior to request 251, and if so, whether they were completed. In some implementations, as a request is completed, the entry for that request in request 221 is updated to indicate it was completed. In such instances, request completion order component 128 can use request list 221 to determine if request 251 completed in order. Alternatively as each request is completed, an entry for the completed request can be made in completion list 222. In such instances, completion list 222 can include entries for the most recently completed requests. So, as a request is completed, if the entry in completion list 222 indicates that the request received before the competed request has already completed, then the currently completed request has completed in order. Otherwise, it has completed out of order.

As shown, request 251 completed before the other requests. As such, completion list 222 would not have any entries that indicate a previously completed request. Request completion 128 can examine request list 221 and determine that request 250 was received before request 251, so request 251 has completed out of order. Request completion order component 128 can generate response 251 that indicates that request 251 has been completed out of order, and store an entry for request 251 in completion list 222. The response can be deferred for a waiting period to account for additional responses. Here, the waiting period has expired, so request completion order component 218 provides the response 251 to device driver 133. Request management component 129 can receive the response and update requests 211 to indicate that request 251 has completed (either by marking the entry for request 251 or deleting the entry from requests 211).

As shown, request 250 completes after request 251. Request completion order component 128 can follow the same process described above. Since request 250 was received before request 251, request completion order component 128 determines that it too has completed out of order in relation to the previously completed request. Request completion order component 128 can generate response 250 that indicates that request 250 has been completed out of order, and store an entry for request 250 in completion list 222. The response can be deferred for a waiting period to account for additional responses. Here, the waiting period has expired, so request completion order component 218 provides the response 250 to device driver 133. Request management component 129 can receive the response and update requests 211 to indicate that request 250 has completed (either by marking the entry for request 250 or deleting the entry from requests 211).

As shown, is completed next. Request completion order component 128 can follow the same process described above. Since request 252 was received after request 250, but before request 251, request completion order component 128 determines that request 252 has completed out of order with respect to requests 251 and 250, and can generate a response 252 to be provided to device driver 133 at the conclusion of the next waiting period of no additional requests are completed. Here, however, request 253 is completed during the waiting period. Since request 253 was received after completed request 252 and completed within the same waiting period, request completion order component 128 determines that request 253 has completed in order in relation to request 252. Request completion order component 128 generates a response 253 that indicates that request 253 has completed in order and deletes the deferred response for request 252. Since the waiting period has not yet expired, request completion order component 128 can defer providing the response 253.

Similarly, request 254 also completes during the waiting period. Since request 254 was received after completed request 253 and completed within the same waiting period, request completion order component 128 determines that request 254 has completed in order in relation to both requests 252 and 253. Request completion order component 128 generates a response 254 that indicates that request 254 has completed in order and deletes the deferred response for request 253. If the waiting period has not yet expired, request completion order component 128 can defer providing the response 254. Here, the waiting period has expired, so request completion order component 128 provides response 254 to device driver 133. As shown, response 254 indicates that request 254 was completed in order. Subsequently, request management component 129 can receive the response 254 and update requests 211 to indicate that request 254 has completed in order. In some implementations, request management component 129 can do this by marking the entries for request 254 and any pending request sent to the device before request 254 (e.g., requests 252 and 253). Alternatively, request management component 129 can delete the entries for these requests from requests 211.

Figure 3:
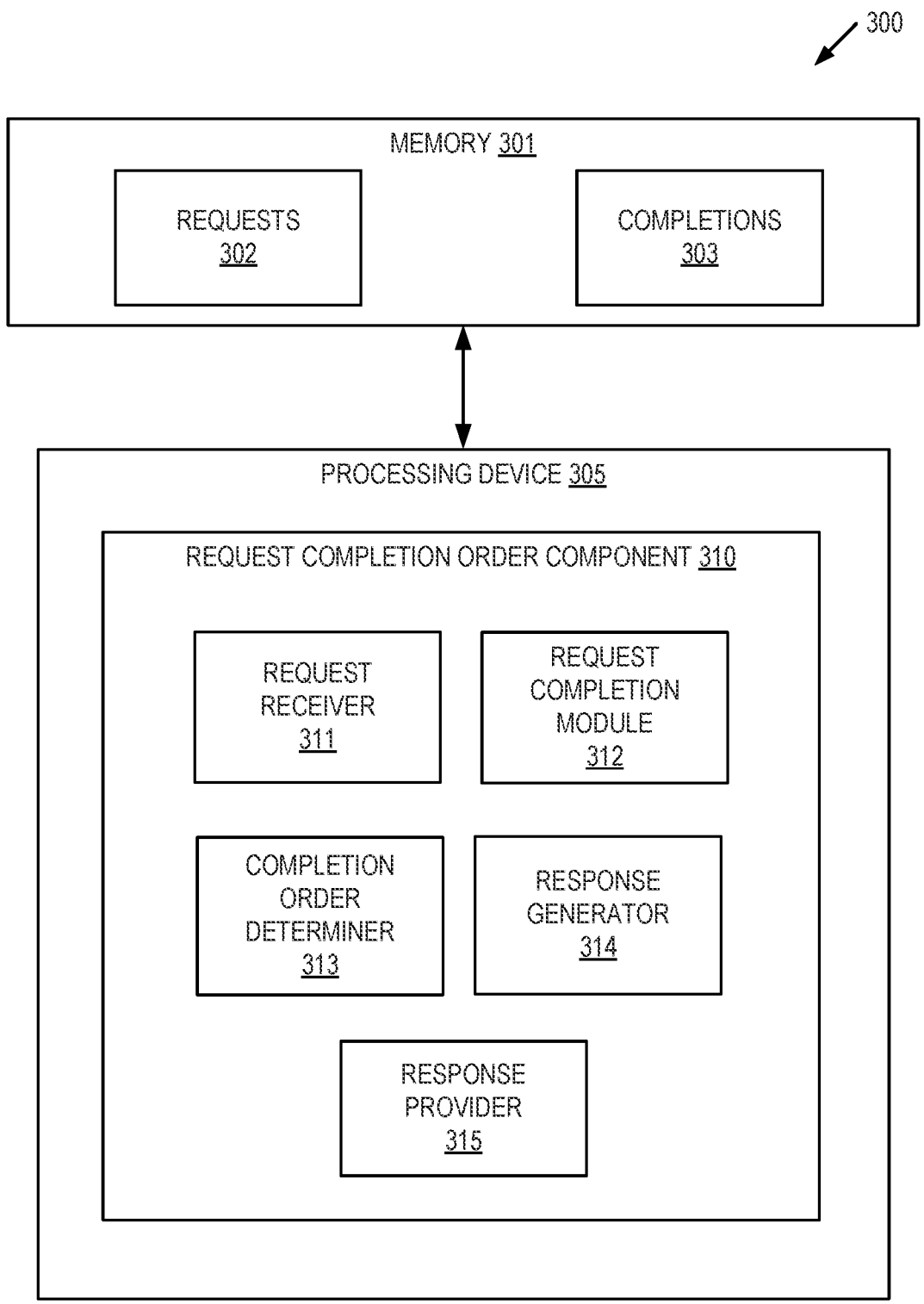
FIG. 3 depicts a block diagram illustrating an example of a request completion order component that facilitates efficient out of order request completion, in accordance with one or more aspects of the present disclosure

FIG. 3 depicts a block diagram illustrating an example of a request completion order component 310 for facilitating efficient out of order processing. In some implementations, request completion order component 310 may correspond to request completion order component 128 of FIG. 1. As shown in FIG. 3, request completion order component 310 may be a component of a computing apparatus 300 that includes a processing device 305, operatively coupled to a memory 301, to execute consensus component 310. In some implementations, processing device 305 and memory 301 may correspond to processing device 502 and main memory 504 respectively as described below with respect to FIG. 5. In various implementations, computing apparatus 300 can be a standalone host computing device that communicates with various tenant computing devices. Alternatively, computing apparatus 300 can be a component of a cloud computing environment made up of multiple host computing devices, an Internet of Things (IoT) edge device, or the like. In various implementations, the computing apparatus 300 can be a physical device hosted by a computer system. Alternatively, computing apparatus 300 can be a host computing system that hosts a virtual device that includes the request completion order component 310.

Request completion order component 310 can include request receiver 311, request completion module 312, completion order determiner 313, response generator 314, and response provider 315. Alternatively, the functionality of one or more of request receiver 311, request completion module 312, completion order determiner 313, response generator 314, and response provider 315 may be combined into a single module or divided into multiple sub-modules.

Request receiver 311 is responsible for receiving requests from a device driver for the device executing request completion order component 310 (e.g., apparatus 300). As noted above, in various implementations the device can be a virtual device associated with a virtual machine. In such instances, the virtual machine may be managed by a hypervisor that executes on the host system of apparatus 300, and the virtual machine may include a device driver component that sends the requests to request receiver 311. Alternatively, the device may be a physical (e.g., bare metal) device that can be associated with a virtual machine, an operating system, an application, or the like. In such instances, the virtual machine, operating system, application, etc. can include the device driver that sends the requests.

In some implementations, the requests received by request receiver 311 can be directed to cause the device to perform a particular operation. For example, if the device is a networking device (e.g., a network interface card), the request can be a request to perform a networking operation using data included in the request. Alternatively, if the device is a graphical interface card, the request can be a request to perform an operation associated with a graphical interface. In various implementations, the requests received by request receiver 311 can be received in a particular order (e.g., a receive order) and stored in memory 301 (e.g., requests 302). Request receiver 311 can store requests 302 such that the receive order is preserved for use by other sub components of request completion order component 310. In some instances, the receive order can be preserved by storing requests 302 as a linked list that chains the requests together in the order received. Alternatively, the requests can be assigned a unique identifier that preserves the sequential order of the requests received. In other implementations, other organizational techniques can be used to preserve the receive order of the received requests.

Request completion module 312 is responsible for completing the received requests received by request receiver 311. In some implementations, request completion module 312 accesses requests 302 and selects a request to complete. In some implementations, request completion module 312 can select a request to complete based on a priority associated with the request. In other implementations, request completion module 312 can select a request to complete in view of the order received. In various implementations, request completion module 312 can complete a request by performing an operation specified by the request. For example, if the request is to perform a networking operation, request completion module 312 can perform that networking operation.

Once completed, request completion module 312 can update requests 302 to indicate that the request has completed. In some implementations, request completion module 302 can access the list of requests received, and update the entry for the newly completed request to indicate that this request has completed. In other implementations, request completion module 312 can maintain a separate list of completed requests (not shown). In such instances, request completion module 312 can add an entry for the newly completed request with the unique identifier associated with the received request so that it can be cross-referenced with requests 302.

Completion order determiner 313 is responsible for determining whether the request completed by request completion module 312 has been completed in the receive order in relation to previously completed requests. In various implementations, completion order determiner 313 can use the unique identifier of the newly completed request and determine whether the newly completed request has been completed in order with respect to the previously processed requests. Completion order determiner 313 can examine requests 302 (or a separate data structure that stores only the completed requests) and identify the request (or requests) that were received prior to the newly completed request. For example, if requests A, B, C, and D were received in that sequential order, and request D is the recently completed request, completion order determiner 313 can determine whether request A, B, and/or C have completed. In particular, since request C was received just before C, completion order determiner can determine whether request C has completed. If so, then request D will have been completed "in order" with respect to C. If request C has not yet completed, then request D will have been completed "out of order" with respect to C.

In some implementations, responsive to determining that the newly completed request has completed in order with respect to the previously completed requests, a response can be generated that indicates that the newly completed request has been completed in order. Similarly, if responsive to determining that the newly completed request has not completed in order with respect to the previously completed requests, a response can be generated that indicates that the newly completed request has not been completed in order. In either case, response generator 314 can be invoked to generate the response.

Response generator 314 is responsible for generating a response to be provided to the device driver. The response can indicate whether the request has been processed in order or out of order with respect to the previously completed requests. Thus, if the driver receives a response that indicates that the request has been completed out of order, the driver can update its internal table to mark that completed request as having been completed. If, on the other hand, the driver receives a response that indicates the request has been completed in order, the driver can identify any pending request that was sent before the currently completed request and mark all of them complete.

In the case of a request that has completed out of order with respect to previously completed requests, response generator 314 can generate the response and invoke response provider 315 to provide the response to the device driver for the device. In some implementations where the request has completed in order with respect to one or more previously completed requests, response generator 314 can similarly generate the response and invoke response provider 315 to provide the response to the device driver.

In some implementations, response generator 314 can generate the response and defer providing it to the device driver so that it can accommodate additional completions within a particular time period. In such instances, deferring providing the response can facilitate providing a response to the device driver can account for a range of completed requests that are completed within the time period. Similarly, if a request is completed out of order, but during the deferral period an additional request is completed that fills in a gap in a series of completed requests, response generator 314 can generate a response that indicates the range has completed in order.

Response generator 314 can store a response generated for a newly completed request. In some implementations, the response can be stored in a memory for the device (e.g., completions 303 of memory 301). If completion order determiner 313 has determined that the currently completed request has been completed in order with respect to previously completed responses, response generator 314 can store the response in completions 303 to indicate that fact. For example, response generator 314 can store an entry for the competed request using the unique identifier of the request with an indicator or flag that indicates that the request has completed in order. Response generator 314 can then defer providing the response to the device driver for a period of time to allow for additional requests to be completed. If an additional request is completed that is next in the receive order with respect to the currently stored completion, response generator 314 can replace the stored response for the previous request with a response for the newly completed request that also indicates it has been processed in order.

In an illustrative example, if requests are received in an order A, B, C, D, E, and request B is completed first, then a response for request B can be generated that indicates it was processed out of order, and stored in memory for a deferral time period. If the time period expires before additional requests have completed, the response for B can be provided to the driver to indicate that B was completed out of order. Subsequently, if request A completes, a response for A can be generated stored in memory that indicates it was also processed out of order. As with B, if the time period expires before additional requests are processed, the response for A can be provided to the driver that indicates that A also completed out of order.

Subsequently, if C, D, and E complete during the next deferral period, the response for C can be generated and stored that indicates it completed out of order. When D completes, the response can be generated and stored that D has completed in order (since D was received immediately after C). In some implementations, the response for D can replace the response for C in completions 303 so that only the response for D is provided to the driver to account for both C and D since both were completed in order. Similarly, when E is completed, the response for E can be generated to indicate that it too has completed in order. The response for E can be stored in completions 303 to replace the response for D. At the end of the deferral time period, the response sent to the device driver can indicate that E has completed in order. The device driver, having received the response for E that indicates that E has completed in order can mark C, D, and E complete since these were the three requests pending completion when the response for E was received by the driver.

Response provider 315 is responsible for providing the completion response to the device driver for responses completed by request completion order component 310 whether completed in order or out of order. When deferring responses using a deferral time period as described above, response provider 315 can be invoked when the deferral time period has been reached (e.g., when the pending responses have been deferred for a period of time that satisfies a deferral time threshold). Thus, at the end of a deferral time period, if the stored response indicates the request was processed out of order, response provider 315 can provide the response to the device driver that indicates that only that particular request has completed. If, at the end of a deferral time period, the stored response indicates that it was processed in order, response provider 315 can provide the response to the device driver that indicates that the associated request has completed in order. In other words, not only did the request associated with the response complete, but any request sent before that response has also completed. The device driver can thus mark all of those pending requests complete.

In some implementations, response provider 315 can provide a single response that indicates the end of a range of requests that were processed in order. Thus, to continue the example noted above, at the end of the deferral period, the response associated with the completion of request E can be provided to indicate to the driver that C, D, and E all completed. In other implementations, response provider 315 can provide a response that indicates the beginning of the range and a separate response that indicates the end of the range. Thus, response provider 315 can provide a response for request C that indicates the start of the in order range and a separate response for E that indicates the end of the range of completed requests.

Figure 4:
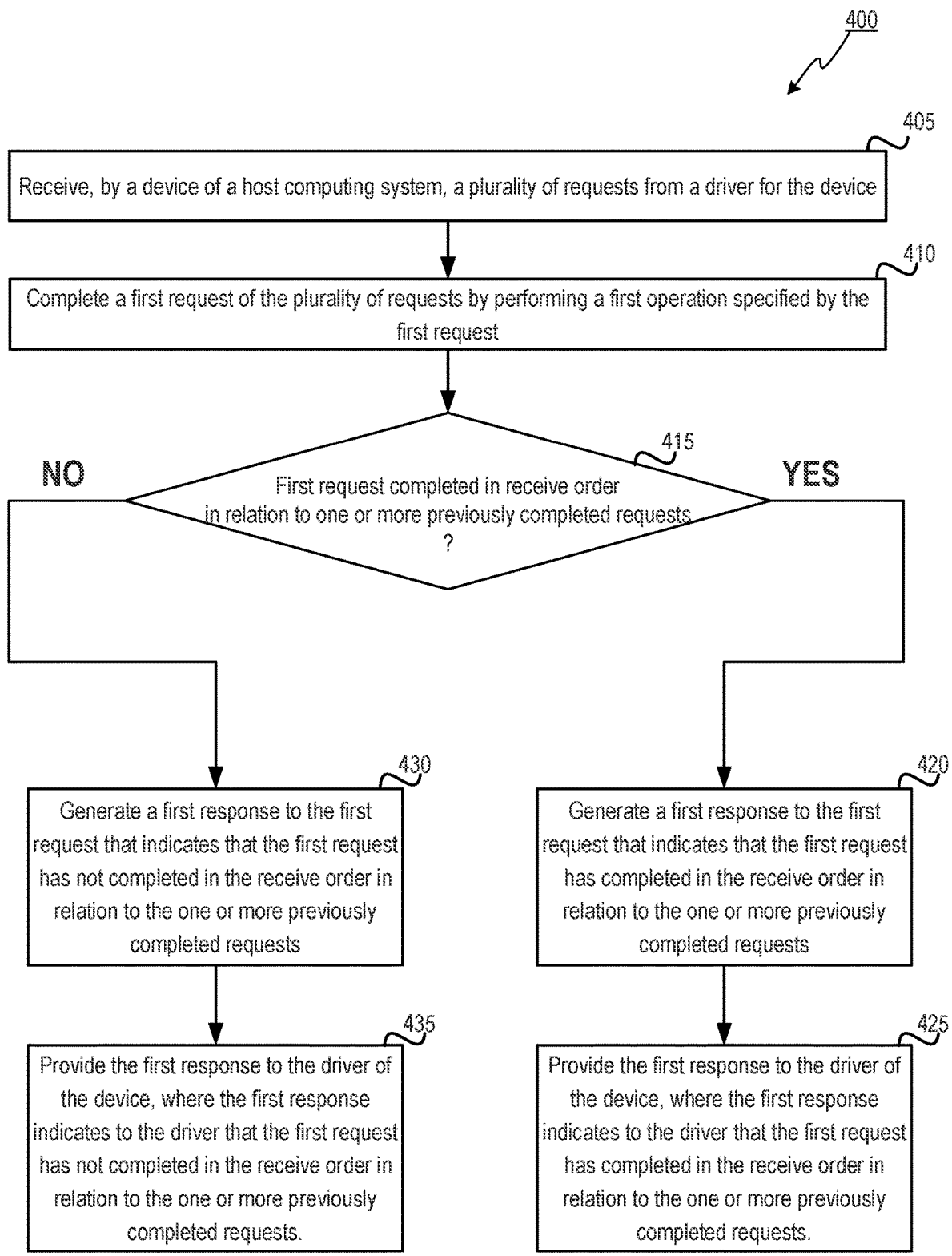
FIG. 4 is a flow diagram of an example method of facilitating efficient out of order request completion, in accordance with one or more aspects of the present disclosure.

FIG. 4 depicts a flow diagram of an example method 400 for facilitating efficient out of order request completion, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the host computer system 110 of FIG. 1) implementing the method. In an illustrative example, method 400 may be performed by request completion component 128 in FIG. 1 or request completion component 310 in FIG. 3. Alternatively, some or all of method 400 might be performed by another module or machine. Method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

At block 405, processing logic receives, by a device of a host computing system, requests from a driver of the device. In various implementations, each request causes the device to perform a corresponding operation, and are received in a receive order. In some implementations, the device is a virtual device associated with a virtual machine that is managed by a hypervisor executing on the host computing system. At block 410, processing logic completes a request by performing an operation specified by the request. At block 415, processing logic determines whether the request completed in the receive order in relation to one or more previously completed requests. If so, processing proceeds to block 420. Otherwise processing proceeds to block 430.

At block 420, processing logic generates a response to the request that indicates that the request has completed in the receive order in relation to the one or more previously completed requests. At block 425, processing logic provides the response to the driver of the device, where the response indicates to the driver that the request has completed in the receive order.

At block 430, processing logic generates a response to the request that indicates that the request has not completed in the receive order in relation to the one or more previously completed requests. At block 435, processing logic provides the response to the driver of the device, where the response indicates to the driver that the request has not completed in the receive order.

Figure 5:
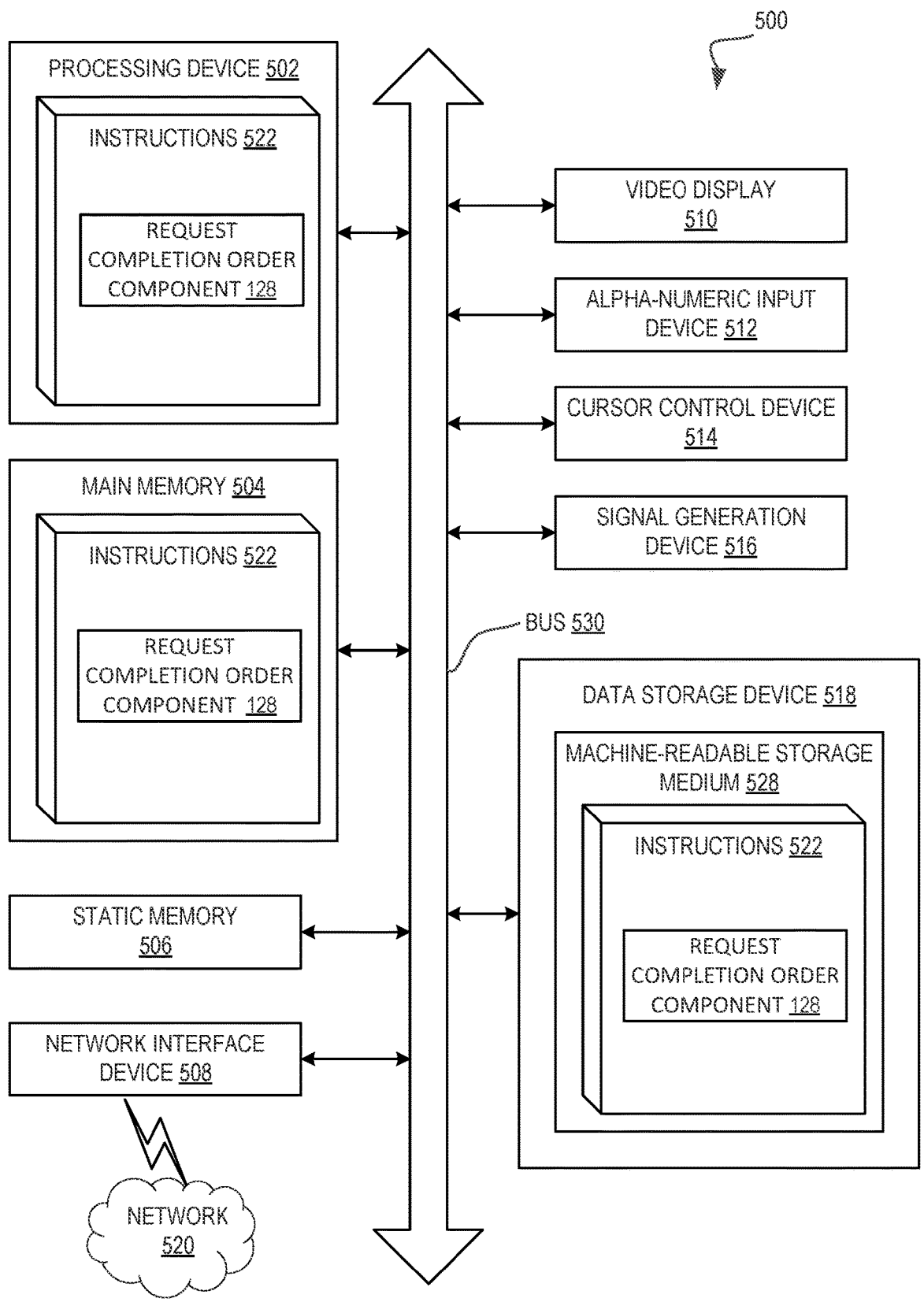
FIG. 5 depicts a block diagram of an illustrative computer system operating in accordance with one or more aspects of the present disclosure.

FIG. 5 depicts a block diagram of a computer system operating in accordance with one or more aspects of the disclosure. In various illustrative examples, computer system 500 may correspond to a computing device 110 within system architecture 100 of FIG. 1, and/or apparatus 300 of FIG. 3. The computer system 500 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other, as well as with other components of the system via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., request completion order component 128). Instructions 522 may also reside, completely or partially, within volatile memory 504 and/or within processing device 502 during execution thereof by computer system 500, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "completing," "determining," "generating," "recovering," "providing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a device of a host computing system, a plurality of requests from a driver for the device, wherein each request of the plurality of requests instructs the device to perform a corresponding operation, and wherein the plurality of requests are received in a receive order;
   completing a first request of the plurality of requests by performing a first operation specified by the first request, wherein one or more requests of the plurality of requests are completed prior to completing the first request according to respective priorities associated with the plurality of requests;
   determining whether the one or more requests and the first request are completed in the receive order or out of the receive order;
   responsive to determining that the one or more requests and the first request are completed in the receive order:
      generating a first response to the first request that indicates that the first request has completed in the receive order in relation to the one or more requests; and
      providing the first response to the driver of the device, wherein the first response indicates to the driver that the first request has completed in the receive order in relation to the one or more requests; and
   responsive to determining that the one or more requests and the first request are completed out of the receive order:
      generating a second response to the first request that indicates that the first request has completed out of the receive order in relation to the one or more requests; and
      providing the second response to the driver of the device, wherein the second response indicates to the driver that the first request has completed out of the receive order in relation to the one or more requests.

2. The method of claim 1, wherein the device comprises a virtual device associated with a virtual machine, and wherein the virtual machine is managed by a hypervisor running on the host computing system.

3. The method of claim 1, wherein, prior to providing the first response to the driver of the device, the method comprises:
   storing the first response in a memory associated with the device; and
   deferring providing the first response to the driver for a first period of time.

4. The method of claim 3, further comprising:
   responsive to determining that the first period of time satisfies a threshold, providing the first response to the driver of the device, wherein the first response indicates to the driver that the first request has completed in the receive order in relation to the one or more requests.

5. The method of claim 3, further comprising:
   completing a second request of the plurality of requests by performing a second operation specified by the second request;

determining whether the second request has completed in the receive order in relation to the first request and the one or more requests; and responsive to determining that the first request has completed in the receive order in relation to the one or more requests, generating a third response to the second request that indicates that the second request has completed in the receive order in relation to the first request and the one or more requests.

6. The method of claim 5, further comprising:

deleting the stored first response from the memory associated with the device;

storing the third response in the memory associated with the device;

deferring providing the third response to the driver for the first period of time; and responsive to determining that the first period of time satisfies a threshold, providing the third response to the driver of the device, wherein the third response indicates to the driver that the second request has completed in the receive order in relation to the first request and the one or more requests.

7. A system comprising:

a memory; and a processing device operatively coupled to the memory, the processing device to:

receive, by a device of a host computing system, a plurality of requests from a driver for the device, wherein each request of the plurality of requests instructs the device to perform a corresponding operation, and wherein the plurality of requests are received in a receive order;

complete a first request of the plurality of requests by performing a first operation specified by the first request, wherein one or more requests of the plurality of requests are completed prior to completing the first request according to respective priorities associated with the plurality of requests;

determine whether the one or more requests and the first request are completed in the receive order or out of the receive order;

responsive to determining that the one or more requests and the first request are completed in the receive order:

generate a first response to the first request that indicates that the first request has completed in the receive order in relation to the one or more requests; and provide the first response to the driver of the device, wherein the first response indicates to the driver that the first request has completed in the receive order in relation to the one or more requests; and responsive to determining that the one or more requests and the first request are completed out of the receive order:

generate a second response to the first request that indicates that the first request has completed out of the receive order in relation to the one or more requests; and provide the second response to the driver of the device, wherein the second response indicates to the driver that the first request has completed out of the receive order in relation to the one or more requests.

8. The system of claim 7, wherein the device comprises a virtual device associated with a virtual machine, and wherein the virtual machine is managed by a hypervisor running on the host computing system.

9. The system of claim 7, wherein, prior to providing the first response to the driver of the device, the processing device is to:

store the first response in a memory associated with the device; and defer providing the first response to the driver for a first period of time.

10. The system of claim 9, wherein the processing device is further to:

responsive to determining that the first period of time satisfies a threshold, provide the first response to the driver of the device, wherein the first response indicates to the driver that the first request has completed in the receive order in relation to the one or more requests.

11. The system of claim 9, wherein the processing device is further to:

complete a second request of the plurality of requests by performing a second operation specified by the second request;

determine whether the second request has completed in the receive order in relation to the first request and the one or more requests; and responsive to determining that the first request has completed in the receive order in relation to the one or more requests, generate a third response to the second request that indicates that the second request has completed in the receive order in relation to the first request and the one or more requests.

12. The system of claim 11, wherein the processing device is further to:

delete the stored first response from the memory associated with the device;

store the third response in the memory associated with the device;

defer providing the third response to the driver for the first period of time; and responsive to determining that the first period of time satisfies a threshold, provide the third response to the driver of the device, wherein the third response indicates to the driver that the second request has completed in the receive order in relation to the first request and the one or more requests.

13. A non-transitory computer-readable media storing instructions that, when executed, cause a processing device to:

receive, by a device of a host computing system, a plurality of requests from a driver for the device, wherein each request of the plurality of requests instructs the device to perform a corresponding operation, and wherein the plurality of requests are received in a receive order;

complete a first request of the plurality of requests by performing a first operation specified by the first request, wherein one or more requests of the plurality of requests are completed prior to completing the first request according to respective priorities associated with the plurality of requests;

determine whether the one or more requests and the first request are completed in the receive order or out of the receive order;

responsive to determining that the one or more requests and the first request are completed in the receive order:

generate a first response to the first request that indicates that the first request has completed in the receive order in relation to the one or more requests; and provide the first response to the driver of the device, wherein the first response indicates to the driver that the first request has completed in the receive order in relation to the one or more requests; and responsive to determining that the one or more requests and the first request are completed out of the receive order:

generate a second response to the first request that indicates that the first request has completed out of the receive order in relation to the one or more requests; and provide the second response to the driver of the device, wherein the second response indicates to the driver that the first request has completed out of the receive order in relation to the one or more requests.

14. The non-transitory computer-readable media of claim 13, wherein, prior to providing the first response to the driver of the device, the processing device is to:

store the first response in a memory associated with the device;

defer providing the first response to the driver for a first period of time; and responsive to determining that the first period of time satisfies a threshold, provide the first response to the driver of the device, wherein the first response indicates to the driver that the first request has completed in the receive order in relation to the one or more requests.

15. The non-transitory computer-readable media of claim 14, wherein the processing device is further to:

complete a second request of the plurality of requests by performing a second operation specified by the second request;

determine whether the second request has completed in the receive order in relation to the first request and the one or more requests; and responsive to determining that the first request has completed in the receive order in relation to the one or more requests, generate a third response to the second request that indicates that the second request has completed in the receive order in relation to the first request and the one or more requests.

16. The non-transitory computer-readable media of claim 15, wherein the processing device is further to:

delete the stored first response from the memory associated with the device;

store the third response in the memory associated with the device;

defer providing the third response to the driver for the first period of time; and responsive to determining that the first period of time satisfies a threshold, provide the third response to the driver of the device, wherein the third response indicates to the driver that the second request has completed in the receive order in relation to the first request and the one or more requests.

* * * * *